United States Patent [19]
Wu et al.

[11] Patent Number: 5,576,688
[45] Date of Patent: Nov. 19, 1996

[54] SIGNAL LIGHT SYSTEM FOR VEHICLE

[76] Inventors: Jun-Da Wu, P.O. Box 1032, Tainan; Chen Ting-Yen, No.128, Chi Ku Tsun, Chi Ku Hsiang, Tainan Hsien; Lin Tien-Wang, No.46, Yi An Street, Tainan, all of Taiwan

[21] Appl. No.: 340,713

[22] Filed: Nov. 16, 1994

[51] Int. Cl.⁶ .................................................. B60Q 1/22
[52] U.S. Cl. .................... 340/463; 340/478; 340/479; 340/332
[58] Field of Search .................................. 340/478, 479, 340/463, 471, 331, 332

[56] References Cited

U.S. PATENT DOCUMENTS

| | | | |
|---|---|---|---|
| 4,651,129 | 3/1987 | Wood et al. | 340/479 |
| 4,712,044 | 12/1987 | Phillips | 340/478 |
| 4,868,719 | 9/1989 | Kouchi et al. | 340/478 |
| 5,258,740 | 11/1993 | Viano et al. | 340/478 |
| 5,298,882 | 3/1994 | Tsai | 340/479 |

*Primary Examiner*—Donnie L. Crosland

[57] ABSTRACT

A signal light system includes an oscillator for generating pulse waves, a counter coupled to the oscillator, a controller connected to the counter, a decoder connected to the controller for receiving signal from the oscillator. A number of gates couple the decoder to a number of lamps for energizing all of the lamps when receiving low potential and for energizing the lamps in series when the gates receives no low potential. Another controller is connected to the gates for propagating low potential to the gates.

2 Claims, 2 Drawing Sheets

SIGNAL LIGHT SYSTEM FOR VEHICLE

BACKGROUND OF THE INVENTION

1. Field of the Invention

The present invention relates to a signal light, and more particularly to a signal light system for vehicles.

2. Description of the Prior Art

Typical vehicles may provide an additional light system for signaling or warning purposes. The additional light system includes a number of lamps arranged in line and actuated one by one. The lamps will be actuated whenever the vehicle is energized such that the lamps may not provide a signaling or warning action when the vehicle is stopped.

The present invention has arisen to mitigate and obviate the afore-described disadvantages of the conventional warning light systems.

SUMMARY OF THE INVENTION

The primary objective of the present invention is to provide a signal light system for indicating the motion of the vehicles.

In accordance with one aspect of the invention, a signal light system comprising a stabilizing circuit for supplying stabilized power, an oscillator for generating pulse waves, a counter coupled to the oscillator, at least a first controller connected to the counter for controlling the counter, a decoder connected to the first controller for receiving signal from the oscillator, a plurality of gates coupled to the decoder, a plurality of lamps connected to the gates, the gates receiving low potential for energizing all of the lamps and the lamps being actuated in series when the gates receives no low potential, a second controller connected to the gates, and means for actuating the second controller so as to propagate the low potential to the gates. The second controller is a transistor.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
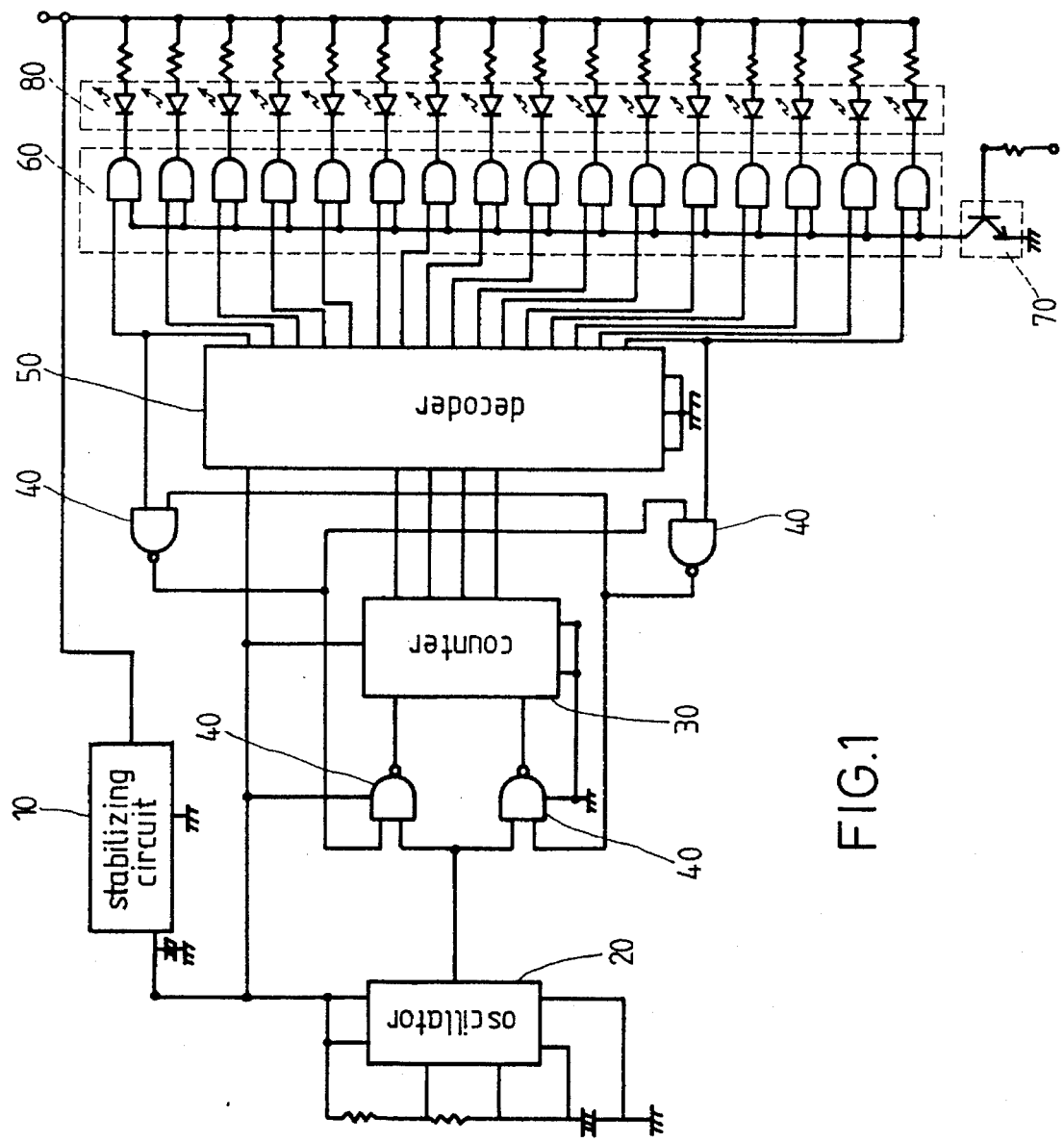
FIG. 1 is an electric diagram of a signal light system in accordance with the present invention.
Figure 2:
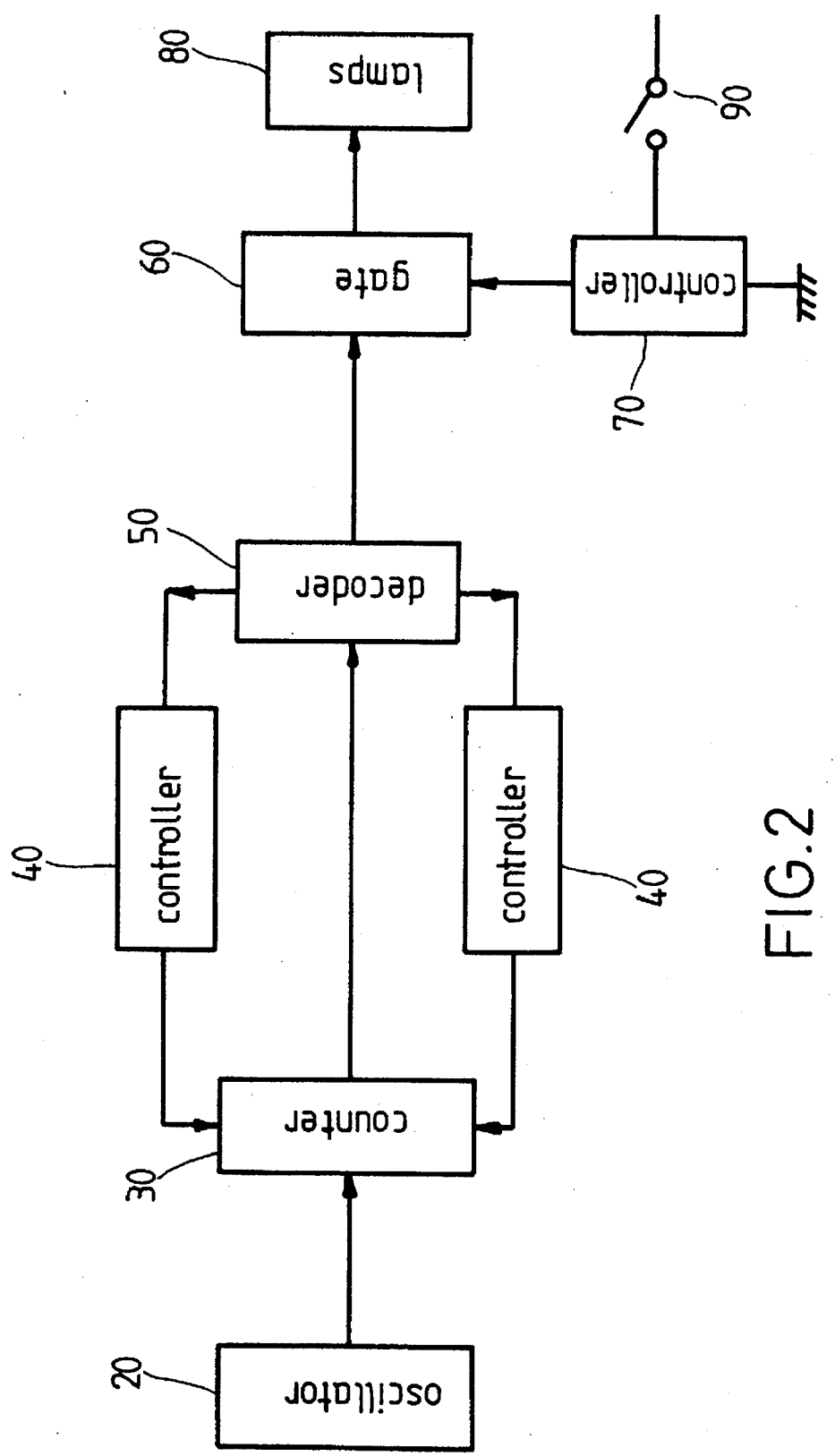
FIG. 2 is a block diagram of the signal light system.

Referring to the drawings, a signal light system for a vehicle in accordance with the present invention comprises a stabilizer circuit 10 for supplying stabilized power source for the system, an oscillator 20 provided for generating pulse waves so as to control the flash speed of the lamps 80, a counter 30 and two controllers 40 for controlling the counter 30, and a decoder 50 for converting the signal of the counter 30 into a 16 digital output.

The signal light system further comprises a number of gates 60, particularly AND gates. The AND gates 60 are connected to the decoder 50 and connected to the lamps 80 for controlling the actuation of the lamps 80. A controller 70 may be a transistor or a relay. In the embodiment as shown in the drawings, the controller 70 is a transistor including a collector connected to the AND gate 60, a grounded emitter and a base coupled to a foot pedal 90 for receiving a positive voltage.

In operation, when the vehicle is energized, the oscillator 20 may generate pulse waves which are propagated to the counter 30. The controllers 40 controls the counter 30. The controller 70 is connected to the brake pedal. When the brake pedal is not actuated, the AND gate 60 may control the lamps 80 to flash in series repeatedly. When the brake pedal is actuated, the controller 70 will be actuated. At this moment, the controller 70 may supply low potential to the AND gate 60 which may then energize all of the lamps 80. When the brake pedal is released again, the AND gate 60 may control the lamps 80 to flash in serials repeatedly again.

Accordingly, the signal light system in accordance with the present invention will indicate and distinguish the moving and braking conditions of the vehicle.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A signal light system comprising:

a stabilizing circuit for supplying stabilized power, an oscillator for generating pulse waves, a counter coupled to said oscillator, at least a first controller connected to said counter for controlling said counter, a decoder connected to said first controller for receiving signal from said oscillator, a plurality of AND gates connected to said decoder, a plurality of lamps connected to said AND gates, said AND gates receiving low potential for energizing all of said lamps and said lamps being actuated in series when said AND gates receives no low potential, a second controller connected to said AND gates, and means for actuating said second controller so as to propagate said low potential to said AND gates.

2. A signal light system according to claim 1, wherein said second controller is a transistor.

* * * * *